(12) United States Patent
Himmelmann

(10) Patent No.: US 8,598,725 B1
(45) Date of Patent: Dec. 3, 2013

(54) UTILIZING FLUX CONTROLLABLE PM ELECTRIC MACHINES FOR WIND TURBINE APPLICATIONS

(75) Inventor: Richard A. Himmelmann, Beloit, WI (US)

(73) Assignee: United Technologies Corporation, Hartford, CT (US)

( * ) Notice: Subject to any disclaimer, the term of this patent is extended or adjusted under 35 U.S.C. 154(b) by 50 days.

(21) Appl. No.: 13/465,400

(22) Filed: Jun. 11, 2012

(51) Int. Cl.
*H02P 9/00* (2006.01)

(52) U.S. Cl.
USPC .......................................................... 290/44

(58) Field of Classification Search
USPC .......................................................... 290/44
See application file for complete search history.

(56) References Cited

U.S. PATENT DOCUMENTS

| | | |
|---|---|---|
| 501,587 A | 7/1893 | Gleason |
| 569,632 A | 10/1896 | Garrood |
| 624,492 A | 5/1899 | Hoffman |
| 2,428,060 A | 9/1947 | Albrecht |
| 2,655,604 A | 10/1953 | Hütter |
| 3,278,000 A | 10/1966 | I'Anson |
| 4,025,724 A | 5/1977 | Davidson, Jr. et al. |
| 4,334,823 A | 6/1982 | Sharp |
| 4,423,333 A | 12/1983 | Rossman |
| 4,653,982 A | 3/1987 | Kojima et al. |
| 4,795,408 A | 1/1989 | Kotegawa et al. |
| 4,915,511 A | 4/1990 | Kotegawa et al. |
| 5,183,386 A | 2/1993 | Feldman et al. |
| 5,562,558 A | 10/1996 | Kubota |
| 5,806,653 A | 9/1998 | Ahls et al. |
| 5,823,686 A | 10/1998 | Murano et al. |
| 6,070,711 A | 6/2000 | Murano et al. |
| 6,102,573 A | 8/2000 | Morimoto et al. |
| 6,367,982 B1 | 4/2002 | Doi et al. |
| 6,465,901 B2 | 10/2002 | Croes |
| 6,685,588 B2 | 2/2004 | Doi et al. |
| 6,742,935 B2 | 6/2004 | Saji |
| 6,855,080 B2 | 2/2005 | Kanehira et al. |
| 6,979,171 B2 | 12/2005 | Lauritsen |
| 7,038,406 B2 * | 5/2006 | Wilson .......................... 318/140 |
| 7,198,469 B2 | 4/2007 | Travere |
| 7,276,807 B2 * | 10/2007 | Luetze et al. ................... 290/44 |
| 7,276,808 B2 | 10/2007 | Weitkamp et al. |
| 7,296,971 B2 | 11/2007 | Borgen |
| 7,301,310 B2 * | 11/2007 | Ganev et al. .................... 322/28 |
| 7,365,447 B2 | 4/2008 | Yoshida |
| 7,612,462 B2 | 11/2009 | Viterna |

(Continued)

FOREIGN PATENT DOCUMENTS

| | | |
|---|---|---|
| EP | 2221476 A1 | 8/2010 |
| JP | 06102886 | 4/1994 |

*Primary Examiner* — Joseph Waks
(74) *Attorney, Agent, or Firm* — Miller, Matthias & Hull LLP

(57) ABSTRACT

A wind turbine includes a tower with a nacelle mounted to the tower. A hub, with a plurality of blades extending therefrom, is rotatably mounted to the nacelle. A main shaft rotates with the hub, and at least one generator system is operatively connected to the main shaft. The generator system of the wind turbine includes a permanent magnet generator. The permanent magnet generator includes a rotor and a stator for generating a high frequency alternating current (HFAC) power output from the rotation of the main shaft, and a magnetic flux diverter circuit for modulating the output of the permanent magnet generator. The generator system may further include a power transformation circuit for transforming the HFAC power output into a low frequency alternating current power output.

20 Claims, 5 Drawing Sheets

(56) References Cited

U.S. PATENT DOCUMENTS

| | | | |
|---|---|---|---|
| 7,771,158 B2 | 8/2010 | Grassi | |
| 7,777,384 B2 | 8/2010 | Gieras et al. | |
| 7,789,624 B2 | 9/2010 | Appa et al. | |
| 7,843,175 B2 * | 11/2010 | Jakeman et al. | 322/28 |
| 7,885,089 B2 * | 2/2011 | Rozman et al. | 363/98 |
| 7,902,689 B2 | 3/2011 | Kinzie et al. | |
| 7,945,350 B2 | 5/2011 | Kinzie et al. | |
| 7,956,482 B2 | 6/2011 | Nies et al. | |
| 8,072,190 B2 * | 12/2011 | Tomanen | 322/44 |
| 8,085,003 B2 * | 12/2011 | Gieras et al. | 322/49 |
| 8,134,331 B2 * | 3/2012 | Rozman et al. | 318/800 |
| 8,299,677 B2 * | 10/2012 | Gieras et al. | 310/216.023 |
| 2003/0071467 A1 * | 4/2003 | Calley et al. | 290/44 |
| 2005/0238489 A1 | 10/2005 | Lund | |
| 2008/0196967 A1 | 8/2008 | Breitbach et al. | |
| 2008/0298967 A1 | 12/2008 | Matesanz et al. | |
| 2009/0097976 A1 | 4/2009 | Driver et al. | |
| 2009/0149999 A1 | 6/2009 | Schramm et al. | |
| 2009/0223164 A1 | 9/2009 | Cook et al. | |
| 2009/0251112 A1 | 10/2009 | Gieras et al. | |
| 2009/0273952 A1 | 11/2009 | Rozman et al. | |
| 2010/0248880 A1 | 9/2010 | Fujiwara et al. | |
| 2010/0314884 A1 | 12/2010 | Ollgaard et al. | |
| 2011/0058956 A1 | 3/2011 | Zuteck | |
| 2011/0135471 A1 | 6/2011 | Wangford | |
| 2011/0156393 A1 | 6/2011 | Wakasa et al. | |
| 2012/0153904 A1 * | 6/2012 | Albsmeier | 322/28 |
| 2013/0016546 A1 * | 1/2013 | Mountain | 363/127 |

\* cited by examiner

UTILIZING FLUX CONTROLLABLE PM ELECTRIC MACHINES FOR WIND TURBINE APPLICATIONS

FIELD OF THE DISCLOSURE

The present disclosure relates generally to wind turbines and, more particularly, to wind power generator systems which employ permanent magnet electric machines.

BACKGROUND OF THE DISCLOSURE

In recent years, wind turbines have been integrated into electric power generation systems to create electricity to support the needs of both industrial and residential applications. These wind turbines capture the kinetic energy of the wind and convert it into electricity. A typical wind turbine includes a set of two or three large blades mounted to a hub. Together, the blades and hub are referred to as the rotor. The rotor is connected to a main shaft, which in turn, is connected to a generator. When the wind causes the rotor to rotate, the kinetic energy of the wind is captured and converted into rotational energy. The rotational energy of the rotor is translated along the main shaft to the generator, which then converts the rotational energy into electricity.

Historically, different types of generators have been used in wind turbines, such as a synchronous induction generator, a double wound induction generator, and a wound field synchronous induction generator. Each has its own advantages and drawbacks. Utilizing a synchronous induction generator is simple; however, it is physically large and not very efficient. The double wound induction generator is capable of increased efficiency; however, there are added costs and complexity involved. The wound field synchronous generator is similar to the synchronous induction generator in that it is simple to use but physically large and not very efficient.

As of late, design engineers have looked to variable speed permanent magnet generator systems. These systems allow the wind turbine to operate at an optimum rotational speed for the prevailing wind conditions, thereby increasing the efficiency of the energy capture. The permanent magnet generator system has been the most efficient means of converting the mechanical shaft power of the wind turbine into electrical energy. However, drawbacks to the conventional permanent magnet generator systems include: added complexity, added expense due to the costs of the supplementary high power rectifier and high power inverter, and reduced reliability due to the full power electronics.

Thus, there exists a need for a simplified, inexpensive and reliable permanent magnet generator system. This invention is directed to solving this need and provides a way to reduce the cost and complexity of the permanent magnet generator system for wind turbine applications.

SUMMARY OF THE DISCLOSURE

According to one embodiment of the present disclosure, a wind turbine is disclosed. The wind turbine may comprise a tower, a nacelle mounted at a top of the tower, a hub rotatably mounted to the nacelle, a plurality of blades radially extending from the hub, a main shaft rotating with the hub, and at least one generator system operatively connected to the main shaft. The generator system of the wind turbine may comprise a permanent magnet generator. The permanent magnet generator of the generator system may comprise a rotor and a stator for generating a high frequency alternating current (HFAC) power output from the rotation of the main shaft, and a magnetic flux diverter circuit for modulating the output of the permanent magnet generator. The generator system may further comprise a power transformation circuit for transforming the HFAC power output into a low frequency alternating current power output.

According to another embodiment, a method for generating regulated low frequency alternating current from wind is disclosed. The method may comprise providing a tower with a nacelle mounted to the tower, a hub being rotatably mounted to the nacelle and including a plurality of blades radially extending therefrom. The method may further comprise using the blades to capture the kinetic energy of wind, converting the kinetic energy of wind into rotational energy with a main shaft which rotates as the wind forces the plurality of blades and hub to rotate, and using at least one generator system operatively connected to the main shaft to generate regulated low frequency alternating current from the rotational energy of the main shaft. The generator system may comprise a permanent magnet generator. The permanent magnet generator of the generator system may comprise a rotor and a stator for generating a high frequency alternating current (HFAC) power output from the rotation of the main shaft, and a magnetic flux diverter circuit for modulating the output of the permanent magnet generator. The generator system may further comprise a power transformation circuit for transforming the HFAC power output into a low frequency alternating current power output.

According to yet another embodiment, a wind power generating system is disclosed. The wind power generating system may comprise a rotatable hub, a plurality of blades radially extending from the hub, a main shaft rotating with the hub, and three generator systems operatively connected to the main shaft for producing three phase low frequency alternating current power output. Each of the generator systems may comprise a permanent magnet generator. The permanent magnet generator of the generator system may comprise a rotor and a stator for generating a high frequency alternating current (HFAC) power output from the rotation of the main shaft, and a magnetic flux diverter circuit for modulating the output of the permanent magnet generator. Each of the generator systems may further comprise a power transformation circuit for transforming the HFAC power output into a low frequency alternating current power output.

These and other aspects and features of the disclosure will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
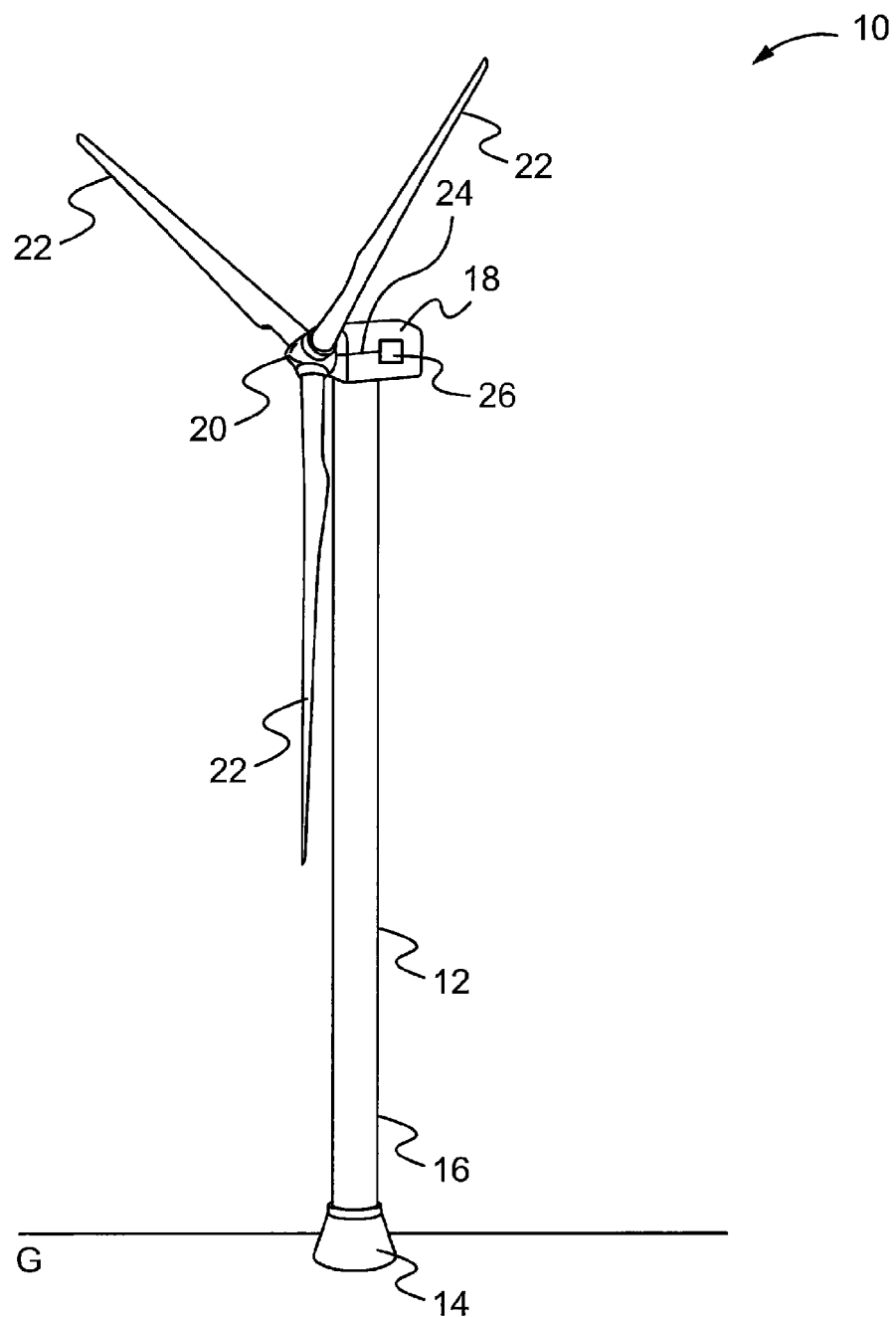
FIG. 1 is a perspective view of a wind turbine made according to one embodiment of the present disclosure.

Referring now to the drawings, and with specific reference to FIG. 1, a wind turbine constructed in accordance with the teachings of the disclosure is generally referred to by reference numeral 10. While all components of the wind turbine are not shown or described, for several background purposes, the wind turbine 10 may include a vertically oriented tower 12, which has a stationary base 14 and body element 16. The stationary base 14 of the tower 12 is permanently situated on the ground G and therefore, the wind turbine 10 is structurally stable and cannot be moved. The body element 16 is attached to the stationary base 14 and extends upwards to a height at which the wind turbine 10 can optimally capture the kinetic energy of the wind. A nacelle 18 may be rotatably mounted on top of the body element 16 of the tower 12. A hub 20, with a plurality of blades 22 radially extending therefrom, may be mounted for rotation to the nacelle 18. Within the nacelle 18, a main shaft 24 may be mounted to the hub 20. Also contained within the nacelle 18 may be a power generation structure 26, which is operatively connected to the main shaft 24.

To start the wind power generation process, the blades 22 of the wind turbine 10 capture the kinetic energy of the wind. As the wind forces the plurality of blades 22 and hub 20 to rotate, the main shaft 24 rotates with the hub 20 and converts the kinetic energy of the wind into rotational energy. Operatively connected to the main shaft 24, the power generation structure 26 subsequently converts the rotational energy from the main shaft 24 into electricity. For example, the power generation structure 26 may convert the rotational energy into a three phase, low frequency alternating current (AC), such as, including but not limited to, 50 Hz or 60 Hz. This three phase low frequency AC power output may then be delivered to the utility power grid and distributed for industrial and residential use.

Figure 2:
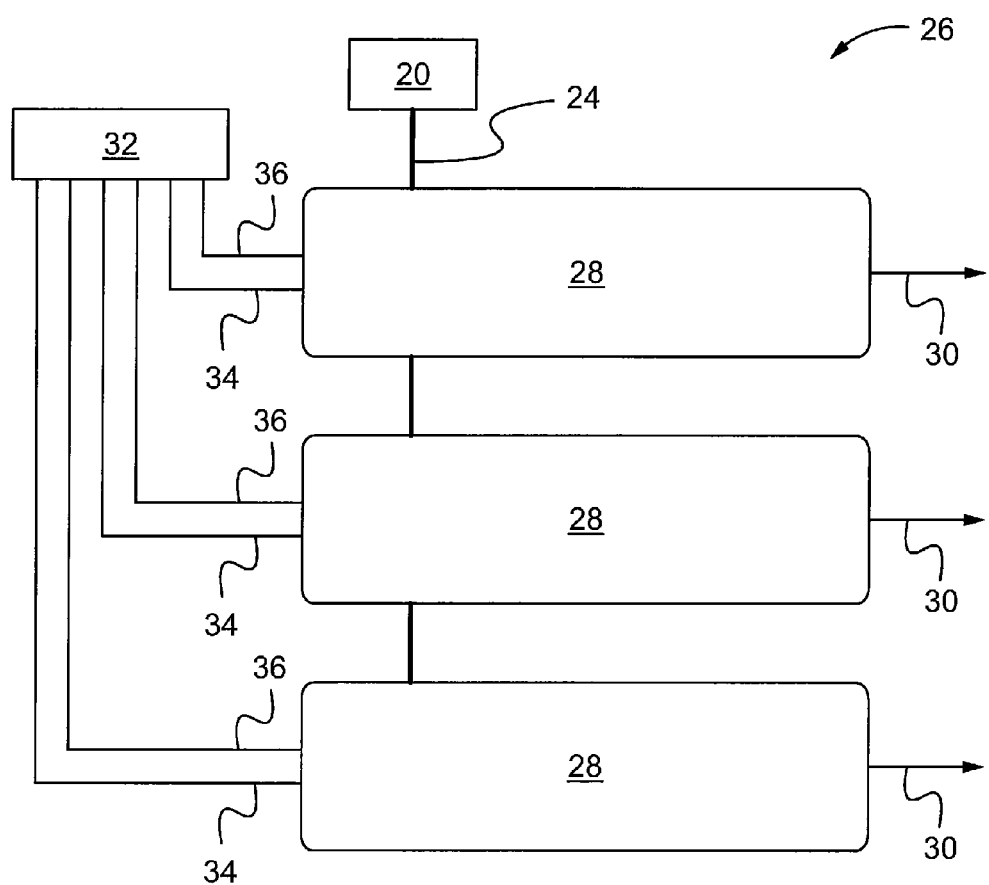
FIG. 2 is a schematic diagram of the power generation structure of the wind turbine in FIG. 1.

For exemplary purposes only, as shown best in the schematic diagram of FIG. 2, the power generation structure 26 may comprise three generator systems 28 operatively connected to the main shaft 24, which is mounted to the hub 20. The power generation structure 26 may comprise three generator systems 28 to produce three phases of low frequency AC power output on power output lines 30. The three generator system power output lines 30 have outputs shifted one hundred twenty degrees (120°) relative to each other. For each of the three generator systems 28, a system controller 32 generates a current reference signal and a voltage reference signal. More specifically, the system controller 32 generates a current reference signal corresponding to the desired frequency of the low frequency AC output power and outputs that signal on current reference lines 34 that are connected to the three generator systems 28. The current reference signals will be shifted 120° relative to each other for the three phase power generation structure 26. The system controller 32 also generates a voltage reference signal and outputs that signal on the voltage reference lines 36 that are connected to the three generator systems 28. Although shown and described as comprising three generator systems to produce three phases of power output, it will be understood that any number of generator systems may be used to comprise the power generation structure and to produce any number of phases of power output within the wind turbine.

Figure 3:
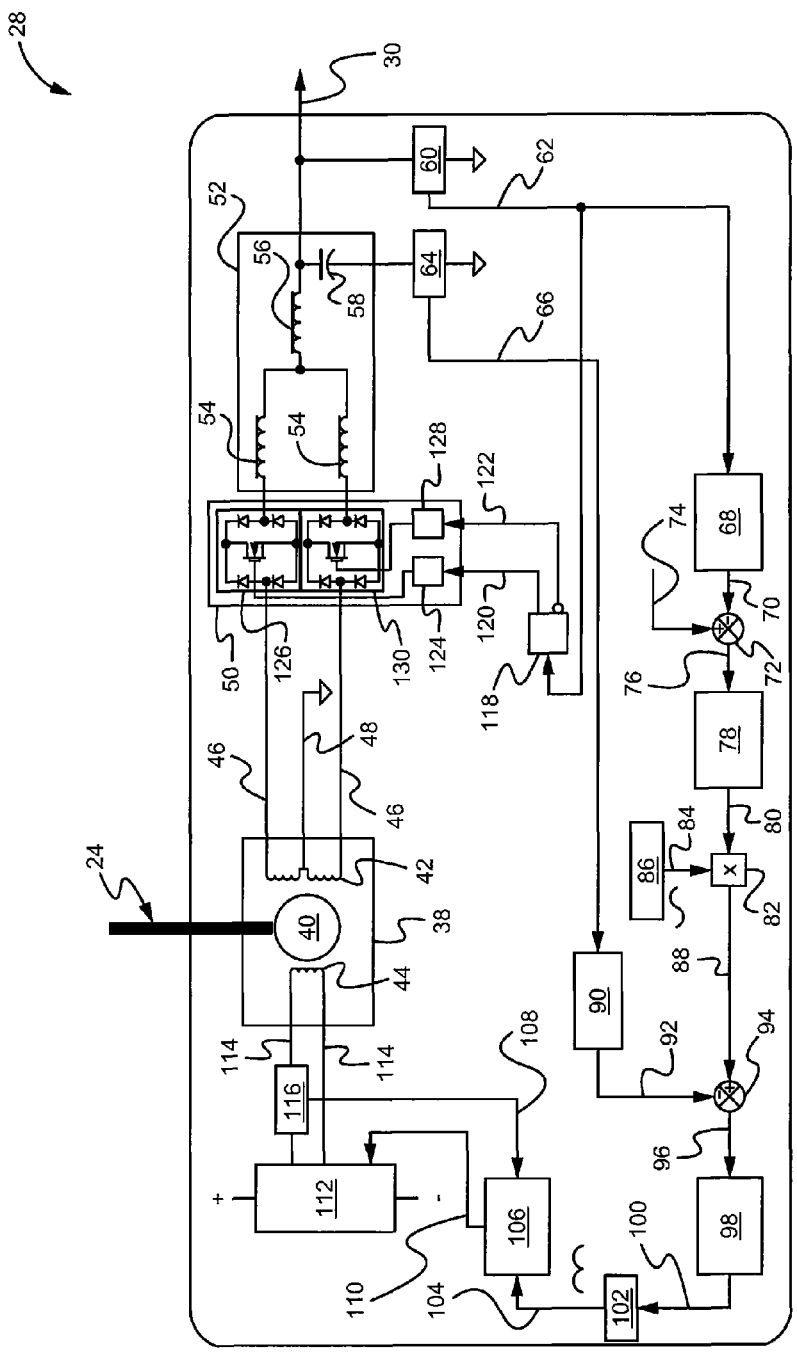
FIG. 3 is a schematic diagram of a single generator system of the power generation structure of FIG. 2.
Figure 4:
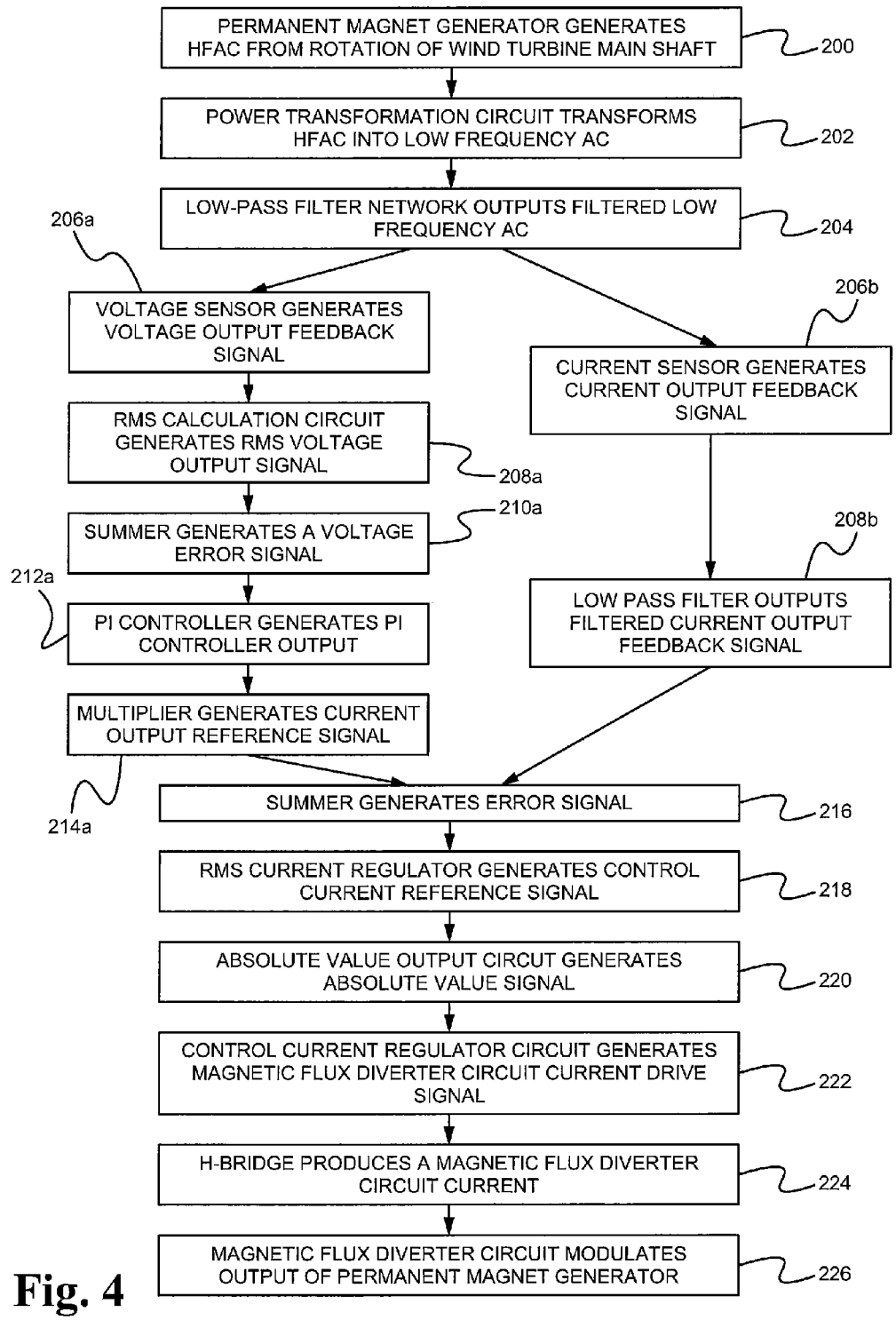
FIG. 4 is an exemplary flowchart outlining the single generator system of FIG. 3.

As shown best in the schematic diagram of FIG. 3, a single generator system 28 of the power generation structure may comprise a permanent magnet generator 38. The permanent magnet generator 38 has a permanent magnet rotor 40 and a stator 42 with a magnetic flux diverter circuit 44. Depicted as step 200 at the start of the exemplary flowchart in FIG. 4, the rotation of the main shaft 24 causes the permanent magnet rotor 40 to rotate, which then generates a high frequency alternating current (HFAC) in the stator 42. The magnetic flux diverter circuit 44 modulates the HFAC power output of the permanent magnet generator 38. To provide a balanced HFAC power output on stator output lines 46, the stator 42 is center-tapped to ground through the center tap on stator neutral line 48.

The generator system 28 may further comprise a power transformation circuit 50. At step 202, the power transformation circuit 50, which may comprise a bi-directional switching network, receives the balanced HFAC power output on stator output lines 22 and transforms the HFAC power output into a low frequency AC power output. Coupled to the output of the power transformation circuit 50, a low-pass filter network 52 filters any HFAC content from the output of the power transformation circuit 50, at step 204, and outputs the filtered low frequency AC power output on generator system power output line 30. The low-pass filter network 52 may comprise two commutating inductors 54, a filter inductor 56, and a filter capacitor 58. During commutation, the two commutating inductors 54 of the low-pass filter network 52 limit bi-directional current within the power transformation circuit 50.

Coupled to the generator system output line 30, the voltage sensor 60 monitors the voltage output between the generator system output line 30 and ground. Based on this sensed voltage output, the voltage sensor 60 generates a voltage output feedback signal on the voltage feedback line 62, at step 206a. Coupled to the output of the filter capacitor 58, the current sensor 64 monitors current output that passes through the filter capacitor 58 from generator system output line 30 to ground. Based on this sensed current output, the current sensor 64 then generates a current output feedback signal on current feedback line 66, at step 206b.

Coupled to the voltage feedback line 62, the root-mean-square (RMS) calculation circuit 68 receives the voltage output feedback signal. Based on the voltage output feedback signal, the RMS calculation circuit generates a corresponding RMS voltage output signal on the RMS output line 70, at step 208a. Coupled to the RMS output line 70, a summer 72 receives the RMS voltage output signal. The summer 72 also receives a RMS voltage output reference signal on a RMS voltage output reference line 74. The voltage output reference line 74 may be connected to, or the same as, voltage reference line 36 from the system controller 32 (in FIG. 2). The RMS voltage output reference signal corresponds to the desired voltage output for the low frequency AC power output on the generator system output line 30. Using the RMS voltage output signal and the RMS voltage output reference signal, the summer generates a voltage error signal on a summer output line 76 that corresponds to the difference between the two signals, at step 210a. Coupled to the summer output line 76, an RMS proportional-plus-integral (PI) controller 78 receives the voltage error signal from the summer output line 76. At step 212a, the PI controller generates a PI controller output signal on a PI controller output line 80 based on the voltage error signal.

Coupled to the PI controller output line 80, a multiplier 82 receives the PI controller output signal. The multiplier 82 also receives a current reference signal from a current reference line 84. A sine wave generator circuit 86 generates the current reference signal on the current reference line 84. The sine wave generator circuit 86 may be part of the system controller 32, which may shift the current reference signals for each of the three generator systems 28 by 120° relative to each other for three phase power, and the current reference line 84 may be connected to, or the same as, current reference line 34 (in FIG. 2). The current reference signal corresponds to the desired frequency of the low frequency AC output power on the generator system output line 30. Using the PI controller output signal and the current reference signal, the multiplier 82 generates a current output reference signal on a multiplier output line 88, at step 214a.

Coupled to the current feedback line 66, a low pass filter 90 receives the current output feedback signal and passes low frequency content of the current output feedback signal. At step 208b, the low pass filter 90 outputs the filtered current output feedback signal on a low pass filter output line 92. Coupled to both the multiplier output line 88 and the low pass filter output line 92, a summer 94 receives the current output reference signal from the multiplier output line 88 and receives the filtered current output feedback signal from the low pass filter output line 92. Based on these two signals, the summer 94 generates an error signal on a summer output line 96, at step 216.

Coupled to the summer output line 96, an RMS output filter capacitor current regulator 98 receives the error signal from the summer 94. At step 218, the RMS current regulator 98 then generates a control current reference signal on control current reference line 100. Coupled to control current reference line 100, an absolute value output circuit 102 receives the control current reference signal. The absolute value output circuit 102 then converts the control current reference signal into an absolute value signal on an absolute value line 104, at step 220. Coupled to the absolute value line 104, a control current regulator circuit 106 receives the absolute value signal on the absolute value line 104. The control current regulator circuit 106 also receives a control current feedback signal on control current feedback line 108. Using the two received signals, the control current regulator circuit 106 generates a magnetic flux diverter circuit current drive signal on a magnetic flux diverter circuit current drive line 110, at step 222. The magnetic flux diverter circuit current drive signal corresponds to the difference between the absolute value signal and the control current feedback signal.

Coupled to the magnetic flux diverter circuit current drive line 110, an H-bridge 112 receives the magnetic flux diverter circuit current drive signal and produces a magnetic flux diverter circuit current on H-bridge output lines 114, at step 224. The H-bridge 112 applies the magnetic flux diverter circuit current drive signal to the magnetic flux diverter circuit 44 to modulate the output of the permanent magnet generator 38, at step 226 which is the end of the flowchart in FIG. 4. More specifically, the magnetic flux diverter circuit 44 receives the magnetic flux diverter circuit current on the H-bridge output lines 114 to control the level of the balanced HFAC output on the stator output lines 46. Coupled to one of the H-bridge output lines 114, a magnetic flux diverter circuit current sensor 116 senses the level of magnetic flux diverter current passing through the H-bridge output lines 116. The magnetic flux diverter circuit current sensor 116 then generates the control current feedback signal on the control current feedback line 108. The control current feedback signal corresponds to the sensed current level.

By way of the voltage output feedback signal on the voltage feedback line 62, a zero crossing detector circuit 118 senses the zero crossings of the desired low frequency AC power output on the generator system output line 30. The zero crossing detector circuit 118 then generates a zero crossing output signal on the zero crossing output line 120. The zero crossing detector circuit 118 also generates an inverted zero crossing output signal on the inverted zero crossing output line 122.

In the power transformation circuit 50, a first bi-directional gate drive circuit 124 receives the zero crossing output signal from the zero crossing output line 120. The first bi-directional gate drive circuit 124 then generates a corresponding first gate drive signal to drive a first bi-directional switch 126 and to control current flow from one corresponding stator output line 46 to the generator system output line 30. A second bi-directional gate drive circuit 128 in the power transformation circuit 50 receives the inverted zero crossing output signal from the inverted zero crossing output line 122. The second bi-directional gate drive circuit 128 then generates a corresponding second gate drive signal to drive a second bi-directional switch 130 and to control current flow from the other corresponding stator output line 46 to the generator system output line 30.

The result of the circuitry of the generator system 28 described herein is a modulated low frequency AC power output, including but not limited to, 50 Hz or 60 Hz AC power. More specifically, by way of the magnetic flux diverter circuit 44, the low power control current reference signal on the control current reference line 100 modulates the HFAC output from the permanent magnet generator 38 on stator output lines 46. The control current reference signal on the control current reference line 100 is a rectified fundamental frequency that is equivalent to the desired frequency of the variably low frequency AC output of the generator system 28 on the generator system output line 30, such as for example, 50 Hz or 60 Hz AC. The control current reference signal on the control current reference line 100 may be of low power to control the high power of the desired low frequency output on the generator system output line 30. The power transformation circuit 50 then transforms the HFAC output on the stator output lines 46 to produce the high power low frequency AC output on the generator system output line 30. This results in the generator system output line 30 having the same frequency as its respective control current reference signal on the control current reference line 100.

Through modulation of the control current reference signal on the control current reference line 100, the generator system 28 maintains a sinusoidal current at the frequency of the desired low frequency AC power output on the generator system output line 30. This is a result of the filter capacitor 58 current reference signal on the summer output line 96 being responsive to the current output feedback signal on the current feedback line 66. In this way, a good waveform is ensured for the desired low frequency AC power output on the generator system output line 30.

Although shown and described with the certain specific embodiment above for the magnetic flux diverter circuit in FIGS. 1-4, it will be understood that other magnetic flux diverter circuits can be implemented as part of the power generation structure 26 of the wind turbine 10 without departing from the spirit and scope of the disclosure. The magnetic flux diverter circuits may utilize at least one extra winding to saturate the magnetic steel of the permanent magnet generator. For exemplary purposes only, some embodiments for the flux diverter circuit may comprise a flux short circuit path between the stator teeth. When the controller applies current to the control winding wrapped around the flux short circuit bar, the steel flux short circuit bar is saturated, thereby forcing the flux from the generator rotor to travel through the main stator laminations. In so doing, power is provided to the main generator output windings.

In yet another embodiment of the present disclosure, the magnetic flux diverter circuit may comprise an additional coil wrapped around the main stator teeth. When the control coil is powered, the main stator teeth saturate, thereby prohibiting the flux from entering the generator stator. While the control coil may force the rotor flux into the main windings in this embodiment, it will be understood that the control coil may also be used to force the flux out of the main windings without departing from the spirit and scope of this disclosure. This results in the permanent magnet generator systems being designed to either produce no main output power without the control coil being powered up or to produce full main output power until the control coil is activated to reduce the output power of the main field.

Figure 5:
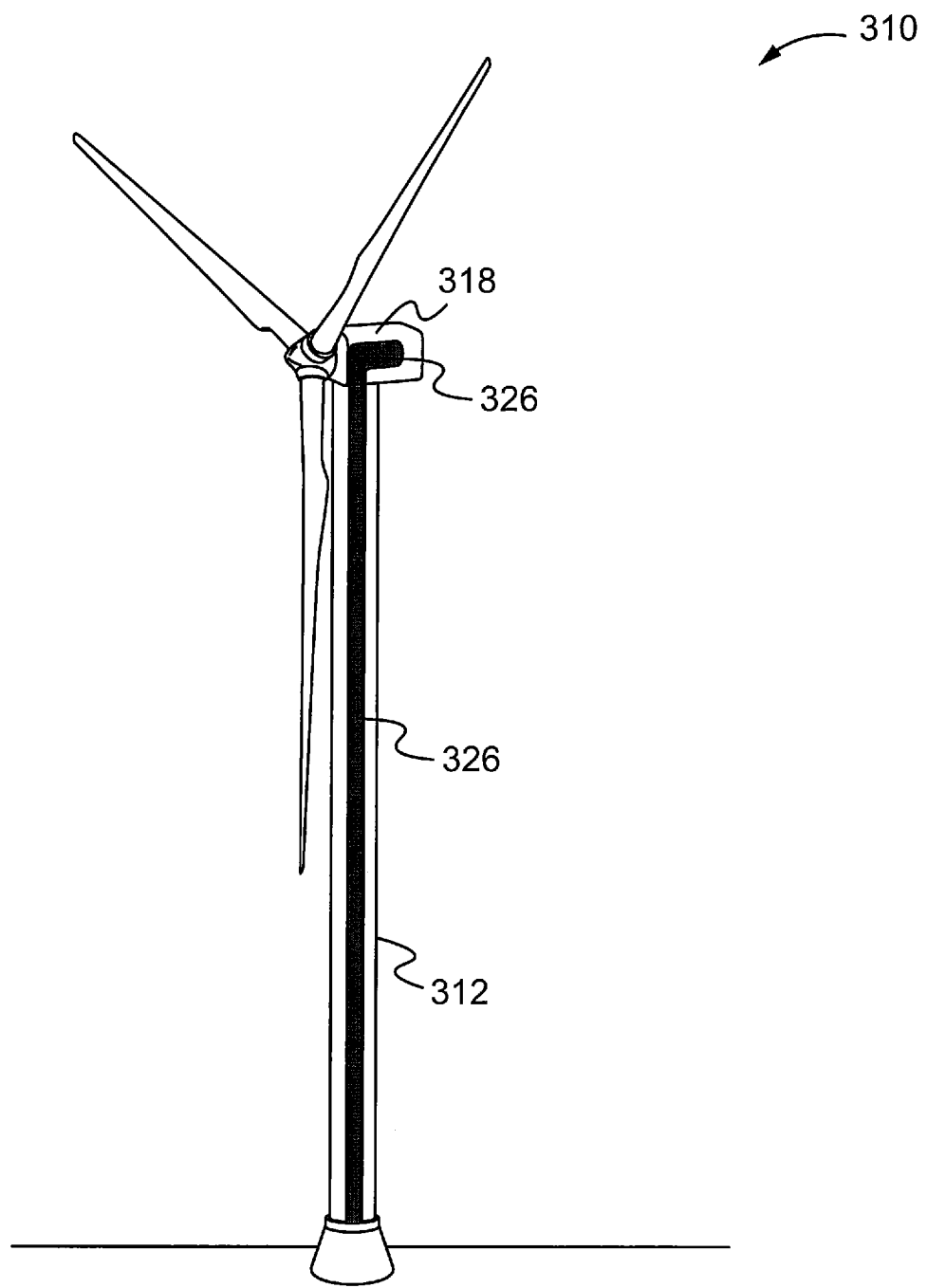
FIG. 5 is a perspective view of a wind turbine made according to another embodiment of the present disclosure.

From the foregoing, it is apparent that the disclosure described is an inexpensive, simple, efficient, and reliable permanent magnet generator system for wind turbine applications. By utilizing the flux controllable permanent magnet generation structure within a wind turbine, the three phase low frequency AC power of, including but not limited to, 50 Hz or 60 Hz can be generated within the wind turbine without the added cost of the high power DC to AC inverter, thereby reducing operating costs, as well as the initial cost of construction, all in a simplified and efficient manner. Although described and shown in FIG. 1 as being contained in the nacelle 18 of the wind turbine 10, it will be understood that the power generation structure 26 may only be partially contained in the nacelle 18 or may not be contained in the nacelle 18 at all. According to another embodiment shown in FIG. 5, the power generation structure 326 may be contained within both the nacelle 318 and the tower 312 with different components of the power generation structure 326 being distributed throughout the wind turbine 310.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A wind turbine comprising:
    a tower;
    a nacelle mounted at a top of the tower;
    a hub rotatably mounted to the nacelle;
    a plurality of blades radially extending from the hub;
    a main shaft rotating with the hub; and
    at least one generator system operatively connected to the main shaft, the generator system comprising:
        a permanent magnet generator, the permanent magnet generator comprising:
            a rotor and a stator for generating a high frequency alternating current (HFAC) power output from the rotation of the main shaft; and
            a magnetic flux diverter circuit for modulating the output of the permanent magnet generator; and
        a power transformation circuit for transforming the HFAC power output into a low frequency alternating current power output.

2. The wind turbine of claim 1, wherein the generator system further comprises a low-pass filter network coupled to the output of the power transformation circuit.

3. The wind turbine of claim 2, wherein the generator system further comprises a current sensor for monitoring current output.

4. The wind turbine of claim 3, wherein the generator system further comprises a voltage sensor for monitoring voltage output.

5. The wind turbine of claim 4, wherein the generator system further comprises a current regulator circuit for generating a control signal responsive to the sensed current and voltage outputs.

6. The wind turbine of claim 5, wherein the generator system further comprises an H-bridge for applying the control signal to the magnetic flux diverter circuit to modulate the output of the permanent magnet generator.

7. The wind turbine of claim 1, wherein the power transformation circuit comprises a bi-directional switching network.

8. The wind turbine of claim 1, further comprising three generator systems to produce three phases of low frequency alternating current power output.

9. The wind turbine of claim 8, wherein the low frequency alternating current power output is one of either 50 Hz or 60 Hz.

10. The wind turbine of claim 9, further comprising a system controller for generating current and voltage reference signals to the three generator systems.

11. A method for generating regulated low frequency alternating current from wind comprising:
    providing a tower with a nacelle mounted to the tower, a hub being rotatably mounted to the nacelle and including a plurality of blades radially extending therefrom;
    using the blades to capture the kinetic energy of wind;
    converting the kinetic energy of wind into rotational energy with a main shaft which rotates as the wind forces the plurality of blades and hub to rotate; and
    using at least one generator system operatively connected to the main shaft to generate regulated low frequency alternating current from the rotational energy of the main shaft, the generator system comprising:
        a permanent magnet generator, the permanent magnet generator comprising:
            a rotor and a stator for generating a high frequency alternating current (HFAC) power output from the rotation of the main shaft; and
            a magnetic flux diverter circuit for modulating the output of the permanent magnet generator; and
        a power transformation circuit for transforming the HFAC power output into a low frequency alternating current power output.

12. The method of claim 11, further comprising using three generator systems to produce three phases of low frequency alternating current power output.

13. The method of claim 12, wherein the low frequency alternating current power output is one of either 50 Hz or 60 Hz.

14. The method of claim 13, further comprising using a system controller for generating current and voltage reference signals to the three generator systems.

15. The method of claim 14, further comprising delivering the three phase low frequency alternating current output to a utility power grid for industrial and residential use.

16. The method of claim 11, further comprising monitoring current output and voltage output.

17. The method of claim 16, further comprising generating a control signal responsive to the sensed current and voltage outputs.

18. The method of claim 17, further comprising applying the control signal to the magnetic flux diverter circuit to modulate the output of the permanent magnet generator.

19. A wind power generating system comprising:
    a rotatable hub;
    a plurality of blades radially extending from the hub;
    a main shaft rotating with the hub; and three generator systems operatively connected to the main shaft for producing three phase low frequency alternating current power output, each of the generator systems comprising:
- a permanent magnet generator, the permanent magnet generator comprising:
  - a rotor and a stator for generating a high frequency alternating current (HFAC) power output from the rotation of the main shaft; and
  - a magnetic flux diverter circuit for modulating the output of the permanent magnet generator; and
- a power transformation circuit for transforming the HFAC power output into a low frequency alternating current power output;

the hub, blades, main shaft and generator systems are all provided as an assembly which is stationary relative to ground.

20. The wind power generating system of claim 19, wherein the power transformation circuit comprises a bi-directional switching network.

* * * * *